United States Patent [19]
Ledel et al.

[11] Patent Number: 5,406,256
[45] Date of Patent: Apr. 11, 1995

[54] REMOTE SENSOR AND MOTION ALARM SYSTEM

[75] Inventors: Jeffrey W. Ledel, 2665 Lakeview Dr., Shakopee, Minn. 55379; Thomas E. Hannon, 6075 Hwy. 212, Chaska, Minn. 55318; Randall B. Sonnicksen, Prior Lake, Minn.

[73] Assignees: Jeffrey W. Ledel, Shakopee; Thomas E. Hannon, Prior Lake, both of Minn.

[21] Appl. No.: 953,563

[22] Filed: Sep. 29, 1992

[51] Int. Cl.⁶ ................................................. G08B 1/08
[52] U.S. Cl. .................................... 340/539; 340/530; 340/566; 340/429
[58] Field of Search ............... 340/539, 530, 566, 429; 455/9, 67.7, 67.1

[56] References Cited

U.S. PATENT DOCUMENTS

| | | |
|---|---|---|
| 3,480,942 | 11/1969 | Hirschberg . |
| 3,517,316 | 6/1970 | Anderson et al. . |
| 3,636,544 | 1/1972 | Codina . |
| 3,778,803 | 12/1973 | Jahn . |
| 3,786,469 | 1/1974 | Massaro et al. . |
| 3,953,843 | 4/1976 | Codina . |
| 4,167,733 | 9/1979 | Krause et al. . |
| 4,187,502 | 2/1980 | Beverly et al. . |
| 4,369,437 | 1/1983 | Thompson, Jr. et al. . |
| 4,396,910 | 8/1983 | Enemark et al. .......... 340/539 |
| 4,540,976 | 9/1985 | Wegrzyn .......... 340/539 |
| 4,644,328 | 2/1987 | Szymansky et al. .......... 340/539 |
| 5,027,105 | 6/1991 | Dailey et al. . |

*Primary Examiner*—Donnie L. Crosland
*Attorney, Agent, or Firm*—Palmatier, Sjoquist & Helget

[57] ABSTRACT

A motion detector having a motion sensitive switch, timing circuit, encoder and radio-transmitting circuit in a housing which may be affixed to a remotely-positioned article; and a decoding and receiving circuit housed in a second housing. The radio-receiving circuit receives the encoded transmitted signal and couples it to a decoding circuit; the decoding circuit is connected to a latch circuit which drives an alarm. The sensitivity of the alarm generation circuits are controlled by a timing circuit, and the alarm may be disabled in order to enable the operator to evaluate the nature of the incoming signals.

6 Claims, 1 Drawing Sheet

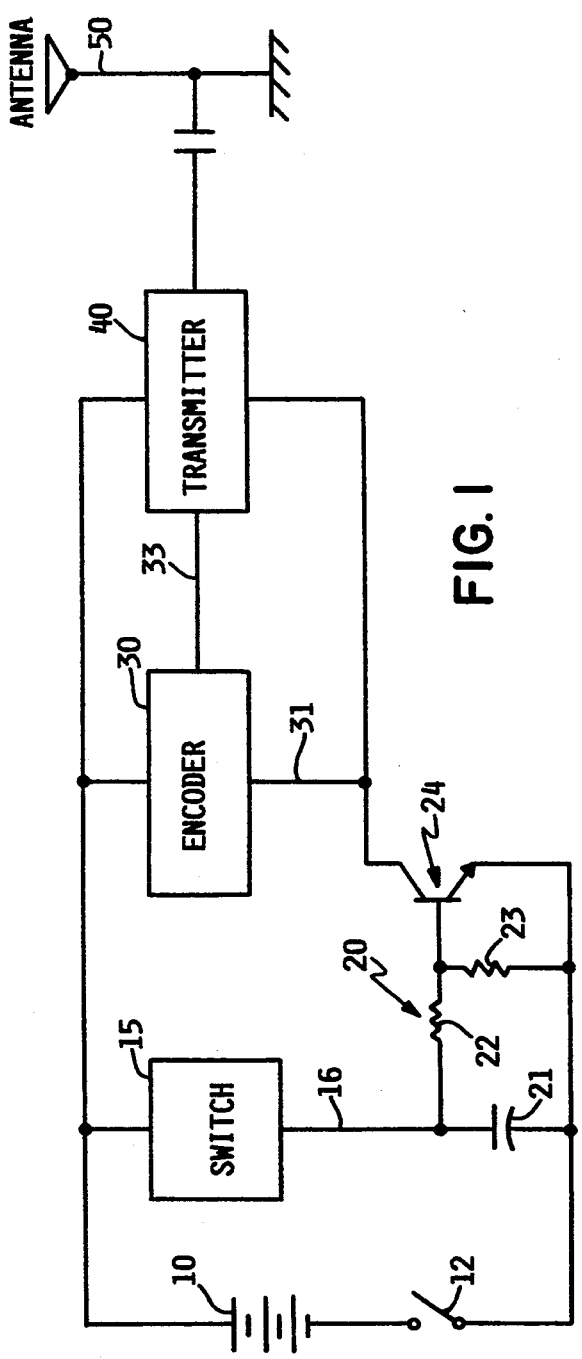
FIG. I
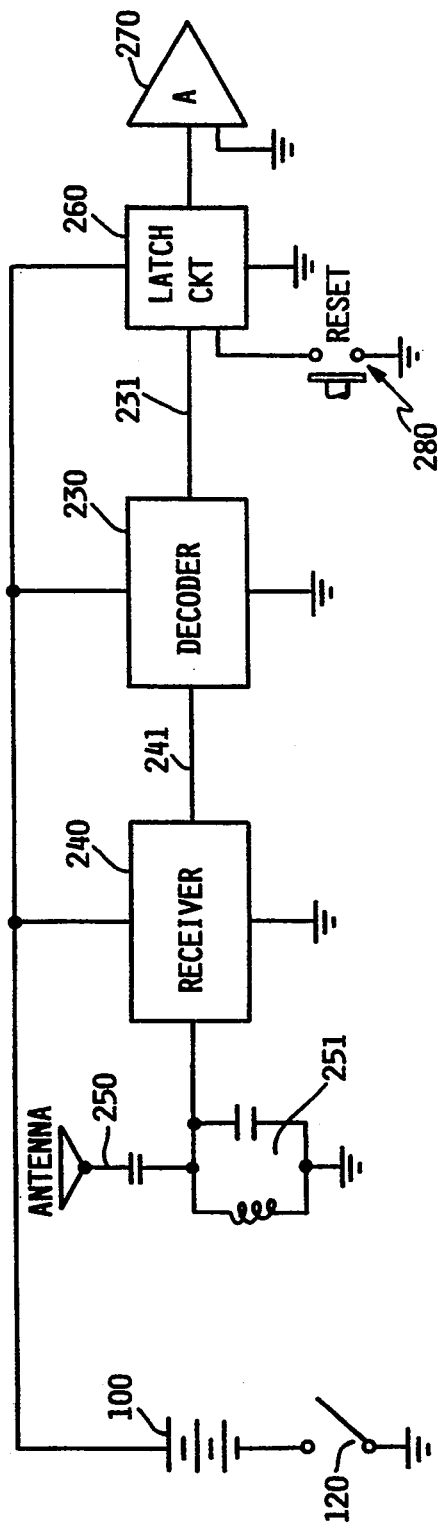
FIG. 2

REMOTE SENSOR AND MOTION ALARM SYSTEM

BACKGROUND OF THE INVENTION

The present invention relates to a motion alarm system which operates in conjunction with a remote sensor device. More particularly, the invention relates to a motion detector coupled to a radio transmitter, and a radio receiver coupled to an alarm unit.

Motion detectors coupled to radio transmitters, together with remotely-positioned radio receivers and alarms have been used in the prior art for various purposes. For example, swimming pool alarm systems have been devised wherein a motion detector is placed in a housing which is capable of floating on the surface of a swimming pool. The motion detector causes a radio signal to be transmitted when the floating device moves by more than a predetermined amount, as for example when a person falls or jumps into the swimming pool, and the radio signal is received by a remotely-placed receiver connected to an alarm. Systems of this general type are disclosed in U.S. Pat. Nos. 4,187,502, issued Feb. 5, 1980; 3,953,843, issued Apr. 27, 1976, and 3,786,469, issued Jan. 15, 1974.

Another type of motion detector which has been known in the prior art is disclosed in U.S. Pat. 5,027,105, issued Jun. 25, 1991. This device utilizes a conductive sphere confined within a housing having conductive walls, so that movement of the housing causes the sphere to correspondingly move, thereby changing the contact resistance between the sphere and the wall. The change in resistance is detected by a circuit which causes an alarm to be sounded.

The present invention fills a need for a motion detector and alarm system which may be temporarily attached to a vehicle or the like, and may be removably positioned in a plurality of locations on or about the various vehicle surfaces, in any orientation. The invention also incorporates a unique identification code, so that the motion detector and receiver may be uniquely coded to special signal combinations, thereby excluding radio signals transmitted from other motion detectors or other sources.

The principal object of the present invention is to provide a motion detector which may be oriented in any position and attached to a surface, and a remotely-positioned detector and alarm circuit which is uniquely coded to receive the motion sensor signals.

Another object of the present invention is to provide a motion detector circuit which may be disabled and reactivated to detect a sequence of motions.

Another object of the present invention is to provide a motion detector having a battery power supply which is activated only during movement of the sensor.

SUMMARY OF THE INVENTION

The foregoing and other objects and advantages are achieved in the present invention by providing a motion-sensitive switch in series arrangement with a timing circuit, the timing circuit permitting activation of an encoder/transmitter circuit, which transmits a radio signal encoded according to the manual settings of encoder switches. A radio receiver receives the transmitted radio signal and develops corresponding signals into a decoder circuit which is selectively set with decoder switches to recognize only a predetermined sequence of input signals. A decoder output is connected to a latch circuit which in turn drives an audible or visible alarm; the latch circuit may be reset by means of a manually-operable switch.

BRIEF DESCRIPTION OF THE DRAWINGS

The objects and advantages of the present invention will become apparent from the following specification and claims, and with reference to the drawings, in which:

FIG. 1 shows a circuit and block diagram of the motion sensor and transmitting portion of the present invention; and FIG. 2 shows a schematic and block diagram of the receiving and alarm portions of the invention.

DESCRIPTION OF THE PREFERRED EMBODIMENT

Referring first to FIG. 1, there is shown a circuit and block diagram of the motion sensor and transmitting portion of the present invention. It is contemplated that all of the components shown in FIG. 1 are housed in a single container, such as a small plastic box. In the preferred embodiment the components of FIG. 1 have been easily housed in a plastic package sized smaller than a deck of cards, for it is contemplated that all of the electronic components are formed of integrated circuits or other miniaturized semiconductor circuits.

A suitable battery 10 and power switch 12 are utilized to energize the circuits into operation. Power is applied to a motion sensor switch 15 which, in the preferred embodiment, is a momentary contact mercury switch. One type of switch which has been found useful for the invention is a switch manufactured by Signal Systems International, Inc. of Lavallette, N.J., under type designation series 2008-4. The switch is a vibration-motion switch which remains electrically open in any orientation when the switch is at rest. Whenever the switch is subjected to shock, vibration or motion the switch contacts momentarily close, producing a signal of very short duration. This signal is transmitted via line 16 to the timing circuit 20. The timing circuit 20 includes a capacitance 21 which rapidly charges to the battery voltage upon receipt of an electrical signal and then discharges through the series resistance combination of resistors 22 and 23. The discharge time of capacitance 21 is determined by the total resistance of resistors 22 and 23, and transistor 24 is connected to the junction point between these two resistors. The voltage applied to drive transistor 24 is equal to the voltage drop across resistor 23, thereby causing transistor 24 to remain in the "on" condition for a predetermined time which is determined by the ratio of the two resistances 22 and 23. The voltage coupled to drive transistor 24 slowly drops to a voltage below its shut-off value, and transistor 24 then shuts off and de-energizes the encoder and transmitter circuits 30 and 40, respectively. The encoder circuit 30 and transmitter circuit 50 are activated during the time period when transistor 24 is switched "on," and the signal developed by transmitter 40 as a result thereof is coupled to antennae 50 for transmission into the atmosphere. In the preferred embodiment, encoder 30 is preferably a Motorola-type MC145026P semiconductor circuit. This semiconductor circuit is utilized in conjunction with a series of nine miniature switches which are coupled to the data input pins 1-7, 9, and 10 to permit the preselection of a preferred transmitting code. The output signal from transistor 24 is a 9-bit serial signal coupled via line 31 to the "transmit enable" input pin (pin 14) of encoder 30. The encoder transmits 9-bits of binary data as defined by the state of the respective switch positions connected to the input pins described above. The binary data output signals are serially transmitted over line 33 to transmitter 40. Transmitter 40 is preferably a frequency-modulated (FM) transmitter of any type generally and commercially known, preferably of low transmitting power. The transmitted power level is preferably in the milliwatt level, so that transmitter 40 will transmit a series of FM signals corresponding to the coded signal received at its input via line 33. The transmitted signals are coupled to the antennae 50 for transmission into the atmosphere.

FIG. 2 shows a schematic block diagram of the receiving and alarm portions of the invention. It is contemplated that all of the circuits shown in FIG. 2 are housed in a very small plastic box, typically of the same size as the housing for the circuits of FIG. 1. A battery 100 and power switch 120 are used to apply power to the circuits of FIG. 2. When power is turned on, the receiver 240 is capable of receiving signals from the antenna 250 via the tuned tank circuit 251. Receiver 240 is connected via line 241 to a decoder circuit 230. Decoder circuit 230 receives the input signals and, if the signal pattern corresponds to preset switch settings associated with the decoder 230, it generates an output signal over line 231. The signal on line 231 is coupled to a latch circuit 260, which in turn drives an alarm 270. Alarm 270 may be an audible alarm such as a buzzer or bell, or it may be a visible alarm such as a lamp. A reset switch 280 is also coupled to latch circuit 260 for purposes of resetting the latch circuit.

When power is applied to the circuits of FIG. 2, the receiver 240 receives any encoded FM signal transmitted by antenna 50 via its antenna 250 and tuned circuit 251. Receiver 240, tuned circuit 251, and antenna 250 are all conventionally obtainable FM receiver circuits, preferably matched to the characteristics of FM transmitter circuit 40. The FM signals received by receiver 240 are converted into a series of binary signals which are transmitted via line 241 to decoder 230. In the preferred embodiment, decoder 230 has been selected to be a Motorola-type MC145028 decoder circuit, which operates in the same manner as the encoder circuit. A series of preselected switch settings are also coupled to decoder 230, so that decoder 230 may be set to only be sensitive to the same pattern of signals as are transmitted by encoder 30. In other words, the respective switches coupled to encoder 30 and decoder 230 are identically set so as to create a predetermined transmitted code and a predetermined recognizable receive code. The output signal from decoder 230 indicates that a valid encoded input has been received, and it drives latch circuit 260. Latch circuit 260 is a conventional, semiconductor latch circuit which becomes latched into a predetermined electronic state when line 231 is activated, and which may be reset by means of a signal caused by depressing the reset switch 280. When the latch circuit is in the active state it generates a signal to drive the alarm 270.

In operation, the components shown in FIG. 1 are preferably physically attached to a device or article whose motion is desired to be detected. For example, the plastic case which houses the components of FIG. 1 may have an adhesive attachment material on its exterior surface so that it can be temporarily affixed to the article in question. Since switch 15 is responsive in any position or orientation, the components of FIG. 1 may be attached in any convenient way to the article. For example, the case may be affixed to the underside of a body panel on a vehicle or to any concealed position on any article which is desired to be monitored. When the article becomes moved switch 15 generates a signal which is coupled to charge the timing circuit 20, thereby creating a predetermined length activation signal for encoder 30. The encoded pulses as generated by encoder 30 and transmitted by transmitter 40 are received by receiver 240 and decoded by decoder 230. Any properly decoded pulses cause latch circuit 260 to become set and thereby activate the alarm.

An advantage of the invention is that the alarm 270 may be deactivated by depressing the reset switch 280, which permits the person monitoring the motion sensor from a remote location to disable the receiver in the event he questions whether the transmitted alarm circuit was a valid signal or a transient signal. If the reset button is depressed, thereby shutting off the alarm, and if the alarm immediately comes back on, the operator will have a high degree of certainty that motion is actually occurring, and is not merely transient or intermittent motion. For example, if a vehicle were equipped with the motion sensor/transmitter unit a person bumping into the vehicle or even a wind effect may cause the transmitter to issue a signal on a one-time basis. If this happens, the operator who has the receiver at a remote location will note the alarm signal, and he may merely depress the reset switch to reset the entire alarm system. However, if he presses the reset switch and the alarm immediately returns after resetting the switch he may then be alerted to the possibility of a real, and not a transient, motion condition.

The second advantage to the invention is that the timing circuit 20 permits a form of sensitivity control to be imparted to the transmitter. The component selection of the resistors and capacitors in timing circuit 20 will determine how long the encoder and transmitter circuit will be conditioned to develop an encoded signal. These components may be selective so as to permit a number of motion sensor signals to become generated before the overall circuit is deactivated, thereby desensitizing the circuits to transient or intermittent motion conditions which would otherwise create an unwanted alarm condition.

A further advantage of the present invention is in the unique identity which each transmitter/receiver pair may be afforded in order to distinguish the pair from all other similar pairs which might be in the radio transmission vicinity. Prior to use the operator may set the nine switches on the transmitter encoder and the receiver decoder to a random, but identical pattern. A transmitter will subsequently transmit encoded pulses according to the preset pattern of switches, and the receiver will subsequently recognize only the preset pattern of switches in its decoded signal. Therefore, virtually any number of transmitter/receiver combinations may be located in a relatively close vicinity, with the likelihood of signal identity between different pairs of units being extremely low.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed is:

1. A system for remotely detecting motion of an article, comprising:
   a) a transmitting unit affixed to said article, comprising a motion detector switch having the characteristic of being momentarily closed when undergoing motion and being normally open at rest in any orientation; a battery and capacitor connected in series with said motion detector switch; a resistor discharge circuit connected to said capacitor, and a switching transistor connected to said resistor discharge circuit; an encoder circuit connected to said switching transistor, and a radio transmitting circuit connected to said encoder circuit;
   b) a receiving unit remotely positionable from said transmitting unit, said receiving unit comprising a receiving circuit connected to receive signals from said transmitting circuit; a decoder circuit connected to said receiving circuit; a latch circuit connected to said decoder circuit; and an alarm circuit connected to said latch circuit.

2. The apparatus of claim 1, wherein said encoder circuit further comprises a plurality of preselectable switches connected to a semiconductor encoder, whereby the semiconductor encoder develops a predetermined sequence of signals responsive to preselectable switch settings.

3. The apparatus of claim 2, wherein said decoder circuit further comprises a plurality of preselectable switches connected to a semiconductor decoder, whereby the semiconductor decoder receives serial signals and develops an output signal when the received signals are representative of preselectable switch settings.

4. The apparatus of claim 3, wherein said transmitting circuit further comprises means for generating frequency modulation signals and said receiving circuit further comprises means for receiving frequency modulation signals.

5. The apparatus of claim 4, further comprising means for manually resetting said latch circuit.

6. In an apparatus for sensing motion of an object and remotely receiving signals indicative of detected motion, the improvement comprising a motion detection switch having the characteristic of being normally open at rest in any orientation and momentarily closed under a condition of motion; a capacitance and battery connected in series with said motion detection switch; a resistive discharge circuit connected to said capacitance and a semiconductor switching circuit connected to said resistive discharge circuit, whereby said semiconductor switching circuit develops an extended-time signal for each momentary motion detection switch closure.

* * * * *